(12) United States Patent
Wheeler et al.

(10) Patent No.: US 6,442,845 B2
(45) Date of Patent: Sep. 3, 2002

(54) COMBINATION STRING AND BLADE TRIMMER WITH AUXILIARY BLOWER FUNCTION

(75) Inventors: Dale Kenneth Wheeler, Fallston; Angela Marie Waldrop, Parkville, both of MD (US); Colin Dyke, North Augusta (CA); William R. Lessig, III, Monkton; Robert A. Meloni, Baltimore, both of MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/852,476

(22) Filed: May 10, 2001

Related U.S. Application Data

(62) Division of application No. 09/622,729, filed on Nov. 7, 2000.
(60) Provisional application No. 60/075,311, filed on Feb. 20, 1998.

(30) Foreign Application Priority Data

Feb. 19, 1999 (WO) .............................. PCT/US99/03696

(51) Int. Cl.[7] ............................................. A01D 34/416
(52) U.S. Cl. ............................ 30/276; 56/12.7; 30/347
(58) Field of Search .................... 30/276, 347; 56/12.7; 15/328, 330

(56) References Cited

U.S. PATENT DOCUMENTS

| | | | |
|---|---|---|---|
| 3,330,102 A | | 7/1967 | Shuman, Jr. |
| 3,973,179 A | | 8/1976 | Weber et al. |
| 4,187,577 A | * | 2/1980 | Lansen et al. ............. 15/328 |
| 4,202,094 A | * | 5/1980 | Kalmar ..................... 30/276 |
| 4,227,280 A | * | 10/1980 | Comer ..................... 15/330 |
| 4,463,498 A | | 8/1984 | Everts |
| 4,578,863 A | | 4/1986 | Laverick |
| 4,607,431 A | * | 8/1986 | Gay ......................... 30/276 |
| 4,707,919 A | | 11/1987 | Tsuchiya |
| 4,790,071 A | * | 12/1988 | Helmig et al. ............ 30/276 |
| 4,856,194 A | * | 8/1989 | Lee ......................... 30/276 |
| 4,911,247 A | | 3/1990 | Kuhlmann et al. |
| D307,860 S | | 5/1990 | Ellis |
| 5,027,591 A | | 7/1991 | Nakamura et al. |
| D320,398 S | | 10/1991 | Clivio |
| 5,181,369 A | | 1/1993 | Everts |
| 5,493,785 A | * | 2/1996 | Lawrence ................. 30/347 |
| 5,566,455 A | | 10/1996 | Hagstrom |
| 5,594,990 A | | 1/1997 | Brant et al. |
| 5,649,413 A | * | 7/1997 | Oostendorp ............. 56/12.7 |
| D414,388 S | | 9/1999 | Wright |

\* cited by examiner

Primary Examiner—Hwei-Siu Payer
(74) Attorney, Agent, or Firm—Harness, Dickey & Pierce, P.L.C.

(57) ABSTRACT

A trimming tool includes a selectable blade attachment for effecting a conversion between a string trimming mode and a blade trimming mode without requiring disassembly of the unit. The assembly includes a locking mechanism (46) selectively engageable with a pivoting trimming blade (40) that pivots between a retracted position and an extended position by centrifugal force. In one embodiment, the locking mechanism is reciprocated between the locked position and the unlocked position based on a rotation direction of the motor. The locking mechanism itself may also be reciprocated by centrifugal force. A spool lock, which is also positioned by centrifugal force, disables automatic string feeding in the blade trimming mode. The trimming tool may also be provided with a blower function incorporating a blower attachment readily attachable as a trimming guard of the trimming tool, or a blower assembly integrated into the tool components.

12 Claims, 9 Drawing Sheets

FIG. 8C
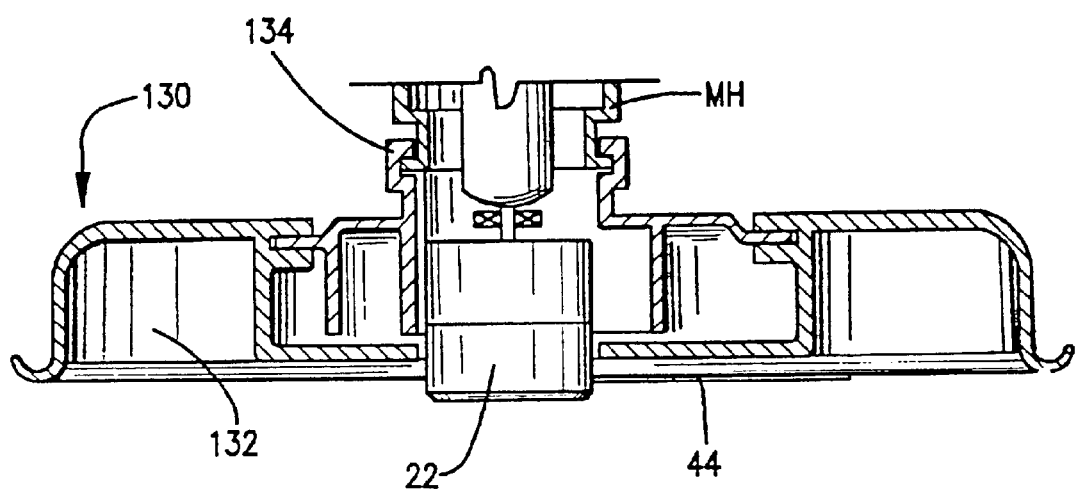
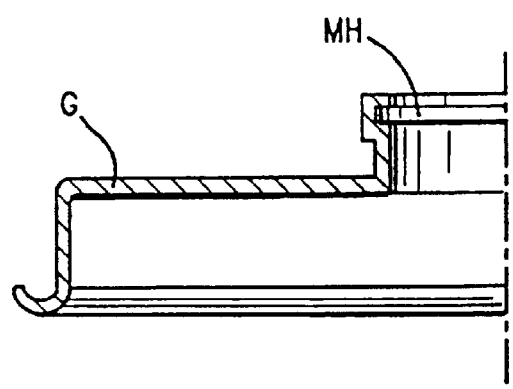
FIG. 8D

COMBINATION STRING AND BLADE TRIMMER WITH AUXILIARY BLOWER FUNCTION

This application is a division application Ser. No. 09/622,729, filed Nov. 7, 2000, and claims benefit of Provisional application Ser. No. 60/075,311, filed Feb. 20, 1998.

BACKGROUND OF THE INVENTION

The present invention relates to a trimming tool and, more particularly, to a combination string and blade trimmer including an auxiliary blower function.

TECHNICAL FIELD

A trimming tool is typically used for cutting vegetation such as grass and the like using one or more strings secured to a string spool assembly that is rapidly rotatably driven by a motor. U.S. Pat. No. 5,063,673 describes one type of string spool housing that incorporates an automatic string feed mechanism that utilizes centrifugal force to sense a string breakage. GB2 000 672 describes a grass cutting attachment for a rotary machine such as an electrically operated drill. A blade trimmer operates on the same principle as a string trimmer, but uses one or more blades in place of the string. DE 25 56 553 discloses a cutter head that includes blades. Blades normally do a better cutting job than string, but blades cannot be used against a curb or hard surface.

It is thus desirable to provide a trimming tool that can be selectively used in a string trimming mode and a blade trimming mode. Previously, in order to convert a string trimming tool to a blade trimming tool, the trimmer head had to be disassembled and reassembled to replace the string spool housing with a blade unit. By the nature of the tool, the disassembly of the trimmer head is inherently a dirty task that most consumers would only perform once and would not bother to repeat.

In addition, clippings resulting from the cutting operation must be raked and collected to improve the overall appearance of the grounds maintenance. U.S. Pat. No. 4,227,280 describes a vacuum/blower attachment that can be mounted to a conventional filament line trimmer. U.S. Pat. No. 4,187,577 describes an attachment device for converting a line trimmer to a blower. U.S. Pat. Nos. 4,835,950 and 4,827,702 show a fan blade attachment that may be attached to the outer periphery of the filament line spool of a filament line trimmer. It would thus also be desirable to incorporate a blower function with the trimming tool to facilitate collection and removal of clippings from the cutting operation.

SUMMARY OF THE INVENTION

The combination string and blade trimming tool according to the present invention enables a quick conversion between a string trimming mode and a blade trimming mode without requiring the user to disassemble and replace a trimmer head. Moreover, a preferred embodiment of the invention also contemplates an auxiliary blower that utilizes airflow generated by operation of the motor to be fluted to an exit opening to effect a blower function. Alternatively, a fan could be provided separately from the motor for increased efficiency.

According to the present invention, a selectable blade assembly attachment is attachable to an existing or slightly modified string trimmer assembly. In one embodiment, one or more trimming blades are pivotally attached to a disc or the like, which in turn engages a string spool housing of the trimmer. The one or more trimming blades are biased toward a retracted position by a spring and are locked in the retracted position by a locking mechanism in a string trimming mode. To convert from the string trimming mode to the blade trimming mode, the motor direction is reversed, releasing the locking mechanism, and the one or more trimming blades are pivoted to an extended position against the force of the spring by centrifugal force. The locking mechanism may be an inertial lock that is activated by centrifugal force. In order to convert back to the string trimming mode, when the motor is stopped, the one or more trimming blades are pivoted toward the retracted position by the spring, and the locking mechanism is engaged when the motor rotates in the string trimming mode direction. With this structure, an operator can readily switch between a string trimming mode and a blade trimming mode without requiring disassembly of the trimming head.

In an alternative arrangement of the invention, the combined functionality can be achieved without requiring reversing of the motor. In this arrangement, a mechanical actuator positioned near the handle of the tool is attached to a rotatable cam plate or the like. When the operator rotates the cam plate, cam surfaces on the cam plate shift a latch pin from a lowered position to a raised position, which in turn displaces a latch from a locking position to a releasing position. In the releasing position, the trimming blade is free to pivot outward by centrifugal force against the force of the spring. When the motor is stopped, if the operator desires to return the tool to the string trimming mode, the trimming blade is returned toward its retracted position by the spring and can be resecured with the latch by again rotating or pulsing the cam plate with the mechanical actuator. Thus, with this structure, the selectable trimming modes can be realized also without requiring disassembly of the trimming head and additionally without requiring an implementation of a reversible motor.

A permanent auxiliary blower capability can be incorporated into the trimming tool according to the invention. In this context, the fan may be separated from or part of the string spool, and a blower scroll is inserted around the fan and under the spool. The scroll is screwed or otherwise secured to the underside of the tool guard. The blower preferably functions continuously with motor cooling air being directed by the blower scroll. Alternatively, an optional air exit cover may be connected by cable or the like to a handle trim/blow selector switch, and in the trim mode, essentially motor cooling air blows into the string or blade plane to act as an air boost; in the blow mode, the cover is full open for mass directed air forward. With the blower functionality, the trimming tool according to the invention incorporates diverse applications and facilitates collection and removal of clippings from the trimming operation.

In accordance with a particular aspect of the present invention, there is provided a selectable blade attachment for string trimming tool including a motor rotatably driving a string spool housing. The selectable blade attachment includes a trimming blade assembly engaging the string spool housing and having at least one trimming blade. The trimming blade is pivotable between a retracted position and an extended position by centrifugal force. The blade attachment preferably further includes a locking mechanism selectively engageable with the trimming blade, wherein in a locked position, the locking mechanism locks the trimming blade in the retracted position. The locking mechanism is preferably structured such that it is reciprocated between the locked position and an unlocked position by centrifugal force. In one arrangement of the invention, the locking mechanism is reciprocated between the locked position and the unlocked position based on a rotation direction of the motor. In preferred forms, the trimming blade is biased toward the retracted position by a spring.

Additionally, the attachment preferably includes a spool lock engageable with the string spool housing in a locking position to prevent automatic string feeding in the blade trimming mode, wherein the spool lock is shifted between a releasing position and the locking position by centrifugal force.

Other features of the invention utilize a locking bar and blade lock plate in the locking mechanism. Structure supporting the blade and locking mechanism may include chamfered edges to decrease wind resistance during operation. In yet another arrangement of the invention, the locking mechanism is engaged and disengaged with an actuator, such as a pull cable.

In accordance with another aspect of the invention, there is provided a trimming tool including a motor having an output shaft, a string spool housing attached to the output shaft for rotation by the motor, wherein the string spool housing spools a cutting string for the tool, and a trimming blade assembly engaging the string spool housing including at least one trimming blade, wherein the trimming blade is pivotable between a retracted position and an extended position by centrifugal force.

In yet another aspect of the invention, there is provided a method of operating a trimming tool in a string trimming mode and a blade trimming mode. The method includes providing a motor having an output shaft, providing a string spool housing attached to the output shaft for rotation by the motor, with the string spool housing spooling a cutting string for the tool, and providing a trimming blade assembly engaging the string spool housing and including at least one trimming blade, with the trimming blade being pivotable between a retracted position and an extended position by centrifugal force. In the string trimming mode, the method includes locking the trimming blade in the retracted position, and rotating the motor with the trimming blade in the retracted position. In the blade trimming mode, the method includes releasing the trimming blade, and rotating the motor so that the trimming blade is pivoted to the extended position by centrifugal force.

The rotating step in the string trimming mode may include the step of rotating the motor in a first direction, and the rotating step in the blade trimming mode may include the step of rotating the motor in a second direction, opposite from the first direction. The method may still further include preventing string spool feeding in the blade trimming mode. In another step, the method includes effecting a blower function using the motor.

BRIEF DESCRIPTION OF THE DRAWINGS

These and other aspects and advantages of the present invention will be described in detail with reference to the accompanying drawings, in which:

FIGS. 8A–8D illustrate structure effecting a blower function according to the present invention with FIG. 8A being a top view of a portion of the trimming tool.

DETAILED DESCRIPTION OF PREFERRED EMBODIMENTS

Figure 1:
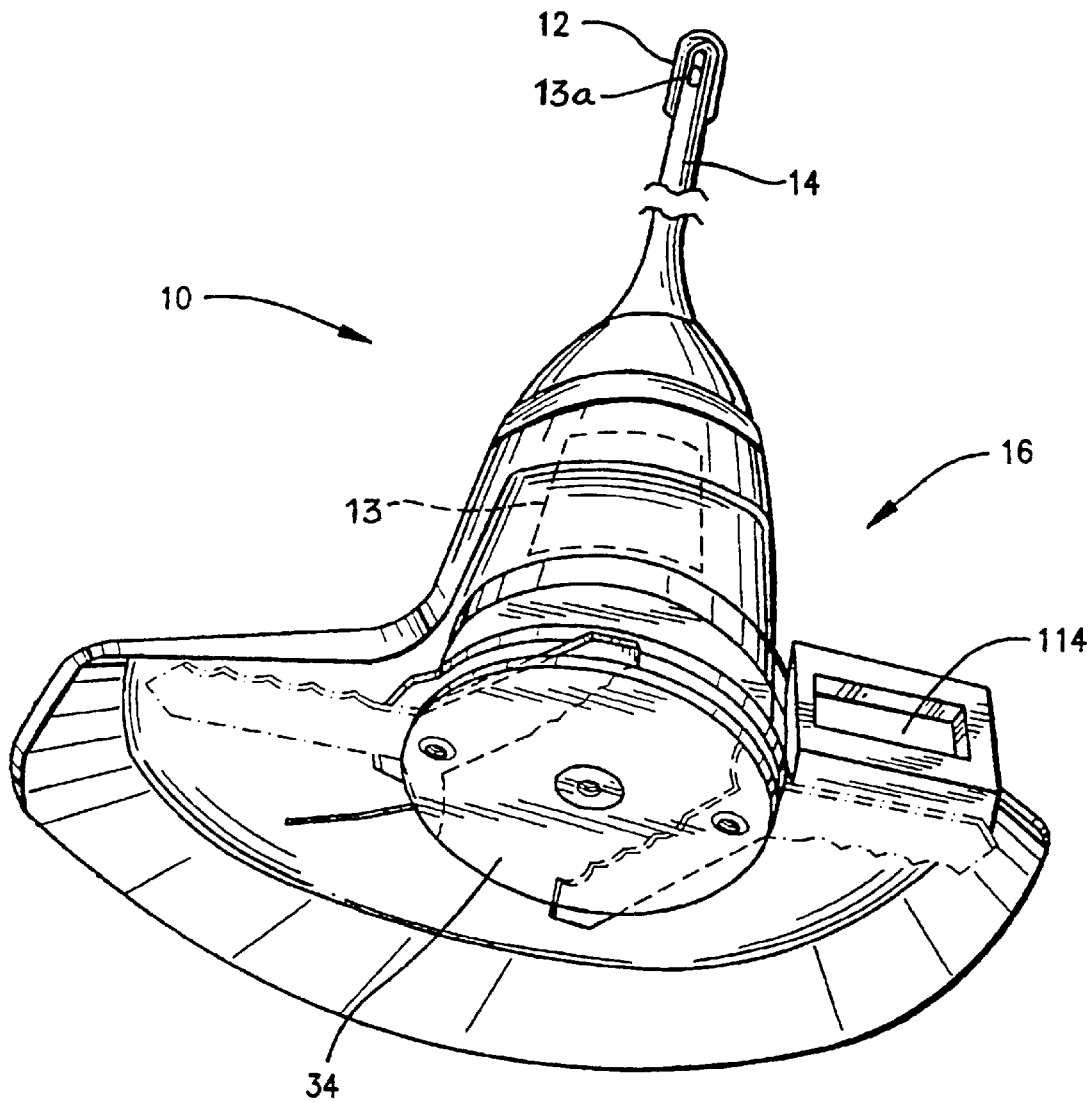
FIG. 1 is a perspective view of the trimming tool incorporating a blade attachment according to the present invention.

Referring to FIG. 1, a trimming tool 10 in accordance with a preferred embodiment of the invention is shown. The trimming tool 10 includes a handle assembly 12 coupled via a shaft 14 to a trimming assembly 16. Operator functions are accessed by conventional switches and the like at the handle. The tool 10 includes a motor 13 having an output shaft and a string spool housing 22 attached to the output shaft for rotation by the motor. The string spool housing 22 spools a cutting string for the tool in a known manner. Additionally, the string spool housing 22 incorporates a known automatic string feed mechanism that utilizes centrifugal force to sense a string breakage as described in U.S. Pat. Nos. 4,607,431 and 5,063,673, the disclosures of which are hereby incorporated by reference. Upon such a breakage, the mechanism effects automatic feeding of the string from the string spool housing 22.

Figure 2:
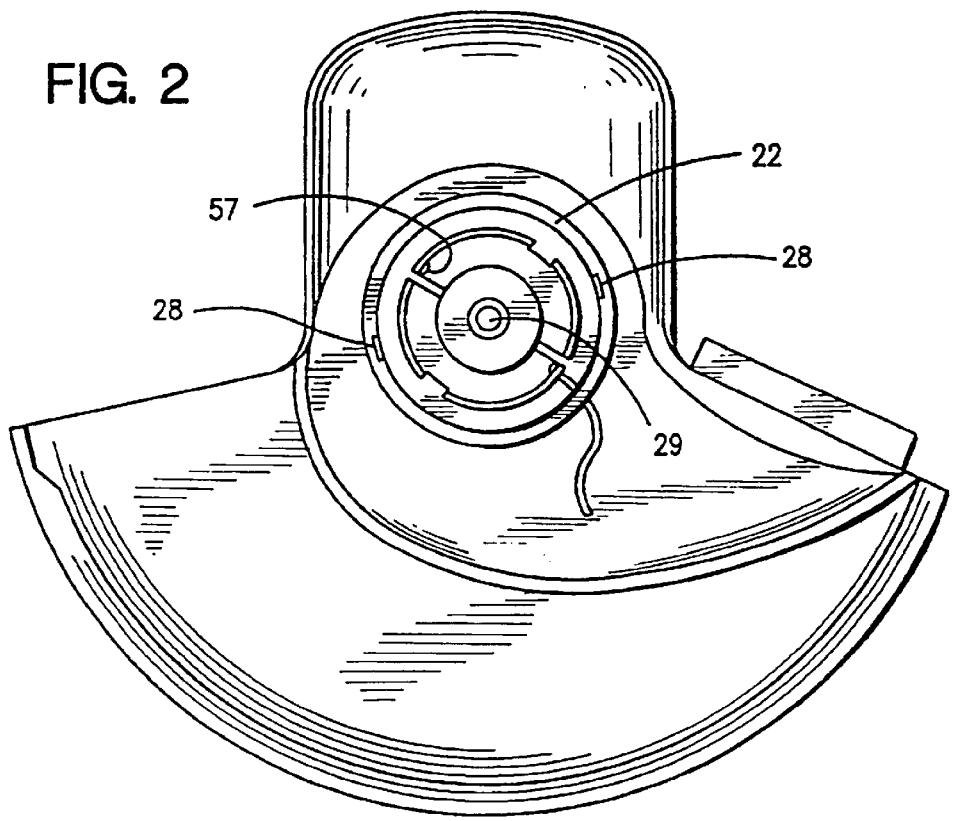
FIG. 2 is a bottom view of the trimming tool with the blade attachment removed showing the string spool housing.

As shown in FIG. 2, a bottom surface of the string spool housing 22 according to the invention is provided with one or more lugs 28 secured thereto for rotation with the string spool housing 22. In a preferred arrangement, the string spool housing 22 is provided with two lugs 28 disposed 180° apart. In the first embodiment according to the present invention, the blade attachment is coupled to the trimming tool 10 via the lugs 28 on the string spool housing 22 and a center shaft 29.

Figure 3B:
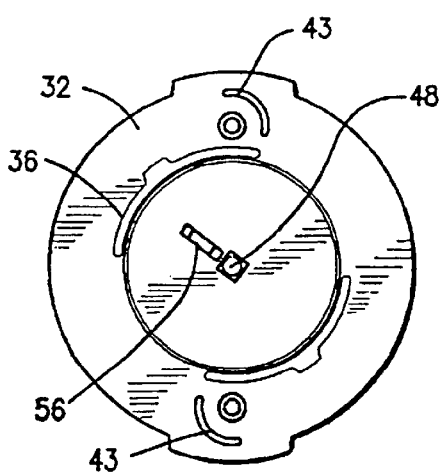
FIG. 3B is a plan view of the first disk.
Figure 3A:
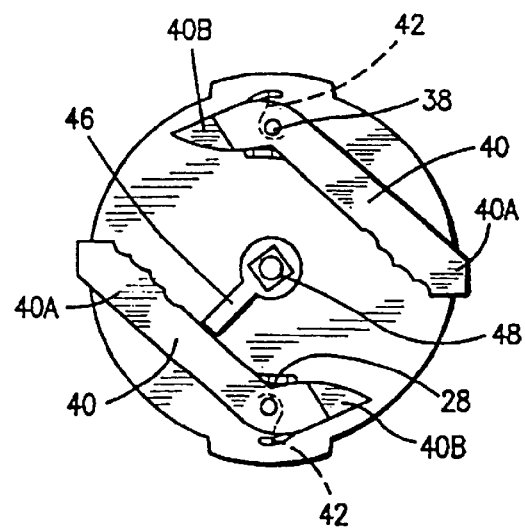
FIG. 3A is a plan view of the blade attachment with the first covering disc removed.
Figure 3C:
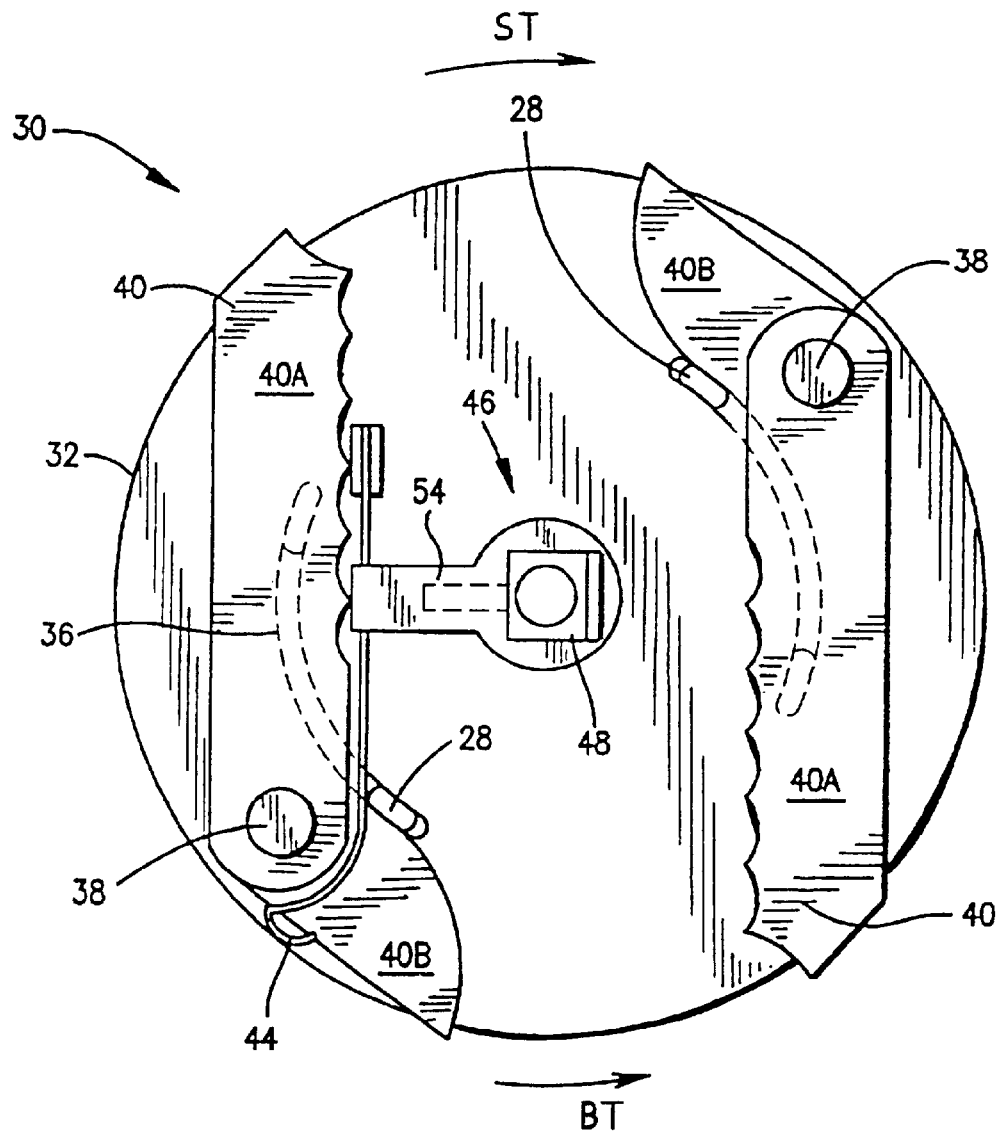
FIG. 3C is a bottom view of the blade assembly attached to the trimming tool.

Referring to FIGS. 3A–3C, the first preferred embodiment of the invention will be described in detail. The blade attachment 30 according to the first embodiment of the invention includes a first disc 32 that is engageable with the string spool housing 22 of the trimming tool via the lugs 28 and the center shaft 29 and a second disc 34 (see FIG. 1) that sandwiches the inside components of the blade assembly 30 between the first and second disks 32, 34.

The first disc 32 includes a pair of arcuate slots 36 formed radially inward from an outside edge of the first disc 32 about midway between the edge of the first disc 32 and its center. The arcuate slots 36 are shaped to receive the lugs 28 secured to the string spool housing 22. The lugs 28 are displaced in the slots 36 as a function of the rotation direction of the string spool housing 22.

The first disc 32 supports a pair of pivot posts 38 disposed substantially 180° from each other. The pivot posts 38 pivotally support trimming blades 40 of the blade assembly 30. As shown in FIGS. 3A and 3C, each trimming blade 40 includes a cutting component 40A pivoting on one side of the pivot post 38 and a camming component 40B on another side of the pivot post 38. The cutting components 40A may be formed with an air foil shaped cross-section to reduce wind drag during operation.

In operation, the trimming blades are pivoted to a retracted position in a string trimming mode and an extended position in a blade trimming mode. In the string trimming mode, the motor 13 is operated to drive the string spool housing 22 in the direction denoted by arrow ST in FIG. 3C. With this rotation, the lugs 28 are positioned in the arcuate slots 36 in engagement with the camming component 40B of the trimming blade 40. Consequently, the blades 40 are locked in the retracted position by the lugs 28 engaging the camming components 40B of the trimming blades 40 and are prevented from pivoting to their extended position.

In order to convert the operating mode from the string trimming mode to the blade trimming mode, the user actuates a mechanical switch 13a at the handle (FIG. 1) or the like to reverse the rotation direction of the motor 13. The motor 13 thus drives the string spool housing 22 in the direction denoted by arrow BT in FIG. 3D. As a result, the lugs 28 are shifted (clockwise in FIG. 3C) along the arcuate slots 36 to the opposite end of the arcuate slots as shown in FIG. 3C. With the lugs 28 shifted to this position, the lugs 28 are disengaged from the camming component 40B of the trimming blade 40, and the trimming blades are free to pivot about the pivot posts 38 by centrifugal force.

The trimming blades 40 are preferably biased toward the retracted position by a torsion spring 42 or the like secured between each trimming blade 40 and the first disc 32. The torsion springs 42 are secured in spring slots 43 formed in the first disc 32 as shown in FIG. 3B. In the blade trimming mode, the centrifugal force acting on the trimming blades is greater than the bias effected by the torsion spring 42. The torsion spring 42 also acts as a displaceable stop for the trimming blades by the spring slot 43, defining a fully extended position. The spring 42 enables the blades to be hyper-extended in the event of contact with a hard object or the like to prevent breakage of the blades.

When the motor 13 is stopped, the torsion spring 42 urges the trimming blades back to the retracted position. If the user elects to convert back to the string trimming mode by again reversing the rotation direction of the motor 13, the lugs 28 engage the camming components 40B of the trimming blades 40 to urge and lock the trimming blades 40 into the retracted position.

The string 44 is spooled about the string spool housing 22 in a conventional manner. From the string spool housing 22, the string is guided via apertures and spring guides to a cutting position. In the blade trimming mode, the string 44 remains extracted but is ineffective as the string guides and the like guide the string to a position directly behind the extended trimming blade 40. By positioning the string in this manner, the string 44 will draft behind the trimming blade 40, thereby reducing drag resistance by the spring and increasing fuel or electrical efficiency and motor output.

In the event of string breakage in the string trimming mode, the trimming tool 10 is provided with the automatic feed mechanism as mentioned above. In general, the automatic feed mechanism utilizes a lock lever to lock and release the string spool housing 22 using centrifugal force generated by a desired length of string. In the event of string breakage during use, the centrifugal moment of the string is reduced to release the locking mechanism, and string is fed from the string spool housing 22 until the string length creates a sufficient centrifugal moment to re-actuate the spool locking mechanism. The details and structure of the auto-feeding mechanism are described in the above-referenced U.S. patents, which are hereby incorporated by reference, and further detail will not be provided.

Figure 4:
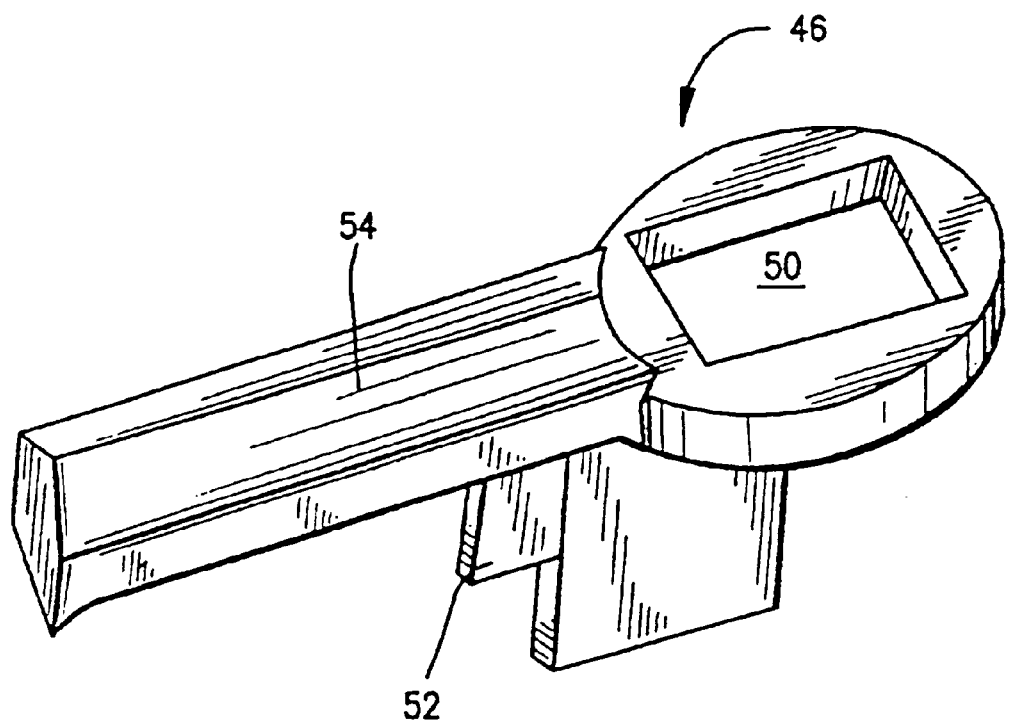
FIG. 4 is a perspective view of a spool lock used in conjunction with the present invention.

In the blade trimming mode, it is necessary to deactivate the automatic string feeding mechanism as the extended blades have an unpredictable result and effect on the centrifugal moment of the string. For this purpose, a spool lock 46 is secured to a raised connector 48 in the first disc 32. Referring to FIG. 4, the spool lock 46 includes a shaped connecting aperture 50 engaging the raised connector 48 (FIG. 3B) of the first disc 32 and a locking tab 52 coupled via an arm 54 or the like to the shaped connecting aperture 50 and extending through a spool lock slot 56 (FIG. 3B) in the first disc 32. The shaped connecting aperture 50 is slightly larger in one dimension (e.g., width in FIG. 3C) than the raised connector 48 of the first disc 32. As a consequence, the spool lock 46 is shiftable on the raised connector 48 by an amount defined by the size of the shaped connecting aperture 50. The spool lock 46 is shiftable by centrifugal force between a releasing position in the string trimming mode and a locking position in the blade trimming mode.

As shown in FIG. 3C, in the string trimming mode, a front end of the arm 54 of the spool lock 46 engages the trimming blade 40 in its retracted position. In the string trimming mode with the trimming blades 40 locked in the retracted position, the pool lock 46 is prevented from being shifted forward into the locking position by one of the trimming blades 40. In the releasing position, the automatic string feed is functional in its normal manner. In the blade trimming mode as described above, the trimming blades 40 are pivoted to their extended position by centrifugal force, and the spool lock 46 is free to shift by centrifugal force to the locking position. In the locking position, the locking tab 52 acts against an inside diameter of the string spool housing 22 to thereby prevent string feeding. The string spool housing 22 may be provided with posts or locking ribs 57 or the like (see FIG. 2) in its inside diameter for this purpose.

As shown in FIG. 3A and 3C, the camming component 40B of the trimming blade 40 is preferably thinner than the cutting component such that in the retracted position, the cutting component engages the arm 54 of the spool lock 46, thereby preventing the spool lock 46 from shifting to the locking position, and in the extended position, the camming component 40B of the trimming blade 40 can be pivoted between the arm 54 of the spool lock and the first disc 32. In this manner in the event that the trimming blade 40 is hyper-extended beyond the displaceable stop by the torsion spring 42 during operation, e.g., by hitting a hard object, the camming component 40B passes between the arm 54 of the spool lock and the first disc 32, and the trimming blade 40 is protected from damage.

Figure 3D:
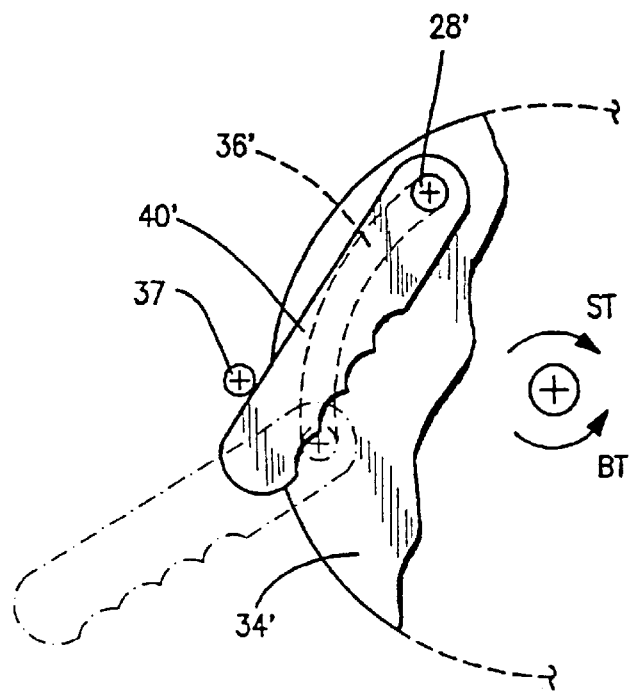
FIGS. 3D and 3E illustrate an alternative blade assembly with FIG. 3D being a top view of the blade assembly.
Figure 3E:
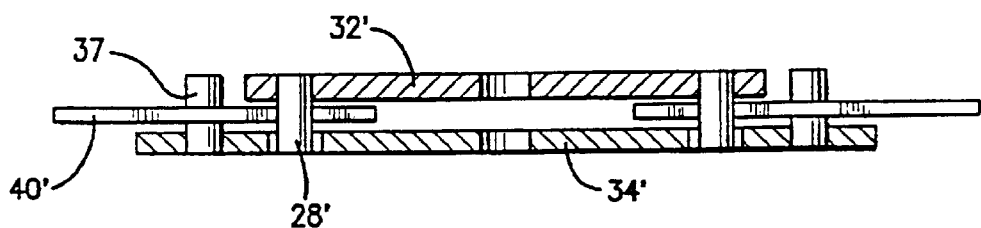

The second disc 34 is fitted to the pivot posts 38 by apertures or the like and secured at its center by any suitable and well-known securing structure such as a snap ring or the like. The second disc 34 sandwiches components of the blade assembly and secures the trimming blades 40 on the pivot posts 38. Another embodiment of the invention is illustrated in FIGS. 3D and 3E. In this alternative arrangement, the blade assembly 30 of the first embodiment is replaced with a modified blade assembly 30', wherein the lugs 28 are replaced with lade pivot pins 28' secured to a driver disc 32', which in turn is coupled for rotation with the string spool housing 22. The driver disc 32' forms part of the string spool housing 22. The pivot pins 28' in the driver disc 32' pivotally support the trimming blades 40' and engage arcuate slots 36' in a driven disc 34'. The driven disc 34' also includes stop pins 37 attached thereto.

In operation, in the string trimming mode, the motor 13 drives the spool housing in the direction indicated by arrow ST. The pivot 28' are shifted to corresponding ends of the slots 36' (clockwise in FIG. 3D) by the rotation direction of the driver disc 32'. The stop pins 37 in the string trimming mode prevent the blades 40' from pivoting outward, and thereby serve as a locking mechanism for the blades 40'.

When the operator desires to operate the tool in the blade trimming mode, the motor 13 is reversed and driven in the direction indicated by arrow BT in FIG. 3D. The pivot pins 28' then shift along the arcuate slots 36' (counterclockwise in FIG. 3D) to the opposite end of the slots 36', and the trimming blades 40' are freed to pivot to their extended positions by centrifugal force (shown in phantom in FIG. 3D). When the motor 13 is stopped, the blades 40' may be returned to their retracted position by engaging the pivot pins 37 as the motor drives the spool housing in the string trimming mode direction, or the blades may be spring biased toward their retracted position.

Similar to the first embodiment, the assembly according to this embodiment incorporates a spool lock to prevent string feeding in the blade trimming mode.

Figure 5:
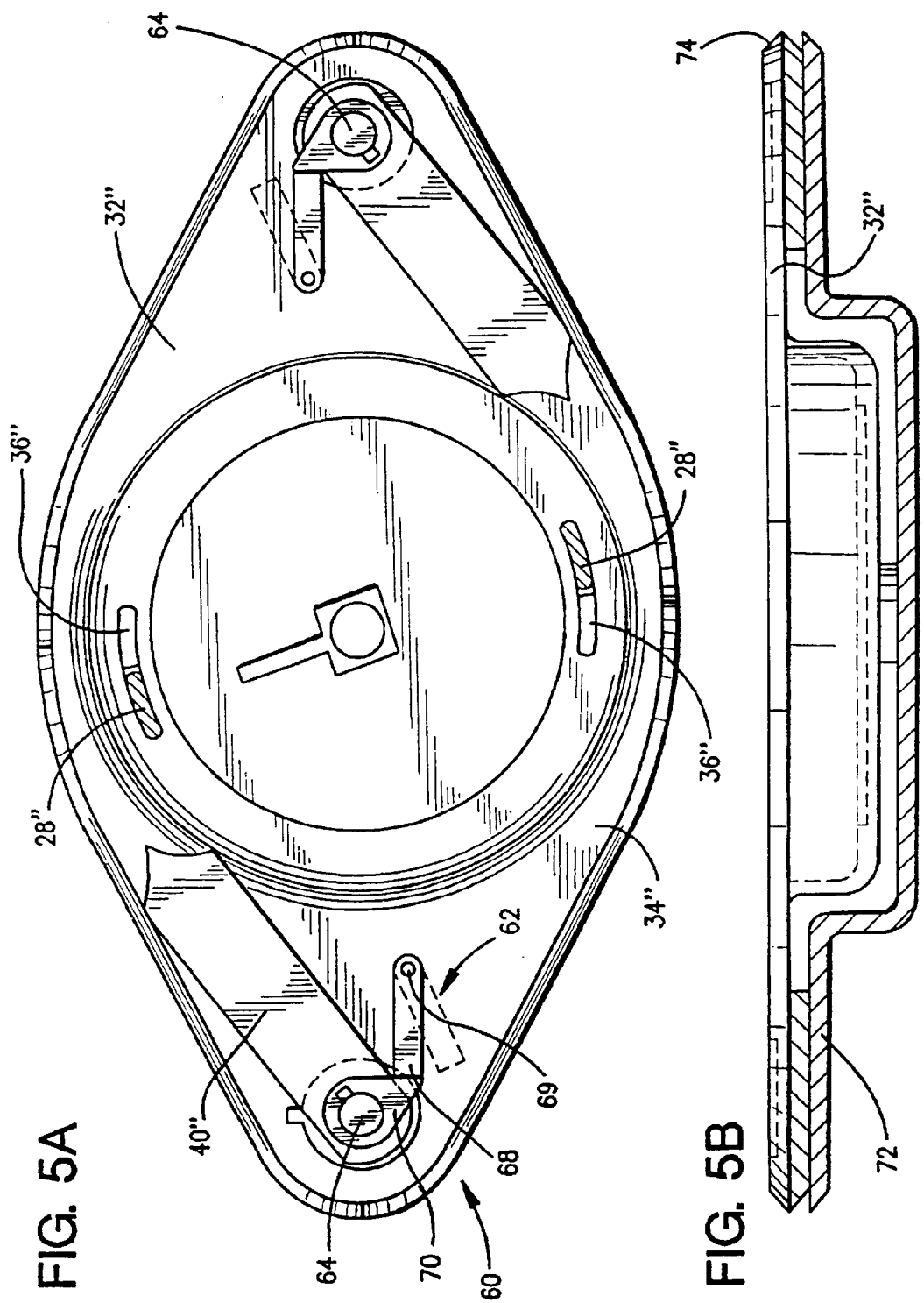
FIG. 5A is a plan view of an another alternative blade assembly.
FIG. 5B is a side view of the blade assembly illustrated in FIG. 5A.
Figure 6:
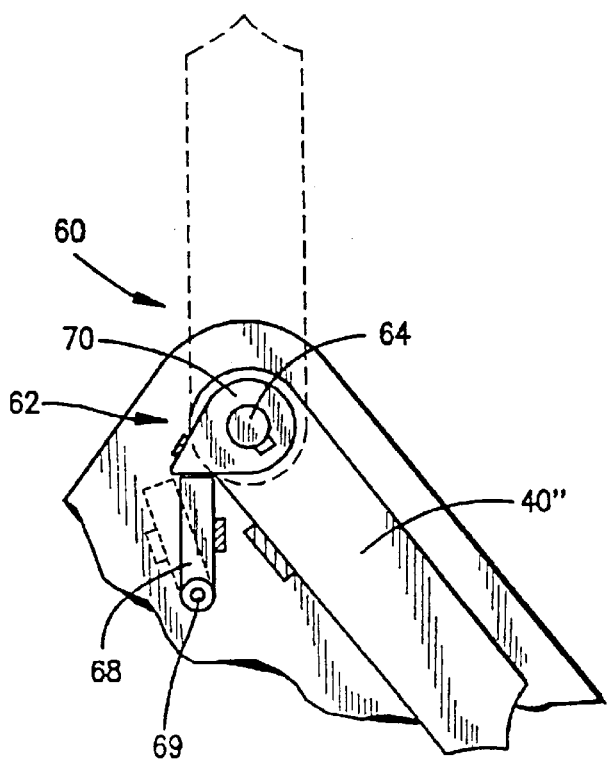
FIG. 6 is a close-up view of an inertial lock in the embodiment illustrated in FIG. 5A.

According to another preferred embodiment of the invention, referring to FIGS. 5A, 5B and 6, the first disc 32" is formed in an oblong shape. The first disc 32" similarly includes arcuate slots 36" for receiving lugs 28" secured to the string spool housing 22. In this embodiment, as seen in FIG. 5A, the arcuate slots 36" are smaller than the arcuate slots 36 in the first embodiment as the locking mechanism in this embodiment does not utilize the lugs 28.

Rather, the slots 36" and slightly modified lugs 28" cooperate to effect the functionality of the spool lock 46 discussed in connection with the first embodiment. In particular, the lugs 28" are provided with a cam surface or the like for cooperation with a corresponding surface on the spool lock 46. In the string trimming mode, the cam surfaces are disengaged from the spool lock 46, thereby permitting the automatic string feed operation. In the blade trimming mode, as the lugs 28" shift along the slots 36", the cam surface of at least one of the lugs 28" engages the corresponding surface of the spool lock, thereby preventing string feeding.

The first disc 32" supports a modified blade assembly 60 incorporating an inertial lock 62. As opposed to pivot posts 38 as in the first embodiment, rotatable posts or blade pivots 64 are rotatably mounted in the first disc 32" with a bearing or the like. The blade pivots 64 are keyed in a suitable manner as shown in the FIGURES, and the trimming blade 40" is correspondingly keyed with a shaped aperture for rotation with the blade pivot 64.

The inertial lock 62 includes a locking bar 68 pivotally secured to the first disc 32" and spaced from the blade pivot 64 as shown in FIG. 5A. The locking bar 68 pivots about a pivot pin 69 attached to the first disc 32". A blade lock plate 70, which is substantially tear-drop shaped as shown in the FIGURE, is also keyed to the blade pivot 64 with a shaped aperture or the like for rotation with the blade pivot. A cover 72 is attached to the first disc 32" over the inertial lock 62 components by screws or an ultrasonic seal and secures the trimming blade 40", blade lock plate 70 and locking bar 68. Both sides of the trimming blade 40" in this embodiment are formed with a cutting edge, such that in the event one edge becomes worn, the cover 72 can be removed, and the trimming blade can be turned over.

In the string trimming mode, the blade 40" is urged to its retracted position by a spring, and the locking bar 68 of the inertial lock 62 is pivoted to a locked position engaged with the blade lock plate 70, thereby preventing the blade 40" from pivoting away from its retracted position. When the motor 13 is reversed to convert the operation from the string trimming mode to the blade trimming mode, centrifugal force causes the locking bar 68 to pivot to a released position separated from the blade lock plate 70 (counterclockwise in FIG. 5A as shown in phantom). The trimming blade 40" is then free to pivot by centrifugal force against the force of the torsion spring to its extended position for blade trimming. In this embodiment, the torsion spring is secured between the first disc 32" and the blade pivot 64 supporting the trimming blade. When the motor 13 is stopped, the torsion spring urges the trimming blade 40" back to the retracted position, and the blade lock plate 70 is passed by the locking bar 68. Upon restart of the motor 13 in the string trimming mode, centrifugal force shifts the locking bar 68 back to its locked position before the blade tries to swing outward.

This embodiment also incorporates the spool lock 46 discussed in connection with the first embodiment. In addition, the second disc 34" is attached to the first disc 32" in a manner similar to that discussed in connection with the first embodiment.

Also similar to the first embodiment, the string is guided from the string spool housing 22 to the exterior of the assembly such that in the blade trimming mode, the string directly follows the blade in its extended position. Consequently, the string rafts with the blade to reduce wind drag and increase system operation and efficiency. In this embodiment, as shown in FIG. 5B, the perimeter of the first disc 32" is provided with a chamfered edge 74 to further reduce wind drag.

As described above, in the embodiments according to the invention, blade trimming is effected by reversing a rotation direction of the motor 13. In each embodiment, a locking mechanism is selectively engageable with the trimming blade to lock the trimming blade in its retracted position in the string trimming mode. Each locking mechanism is structured such that it is reciprocated between a locked position and an unlocked position based on a rotation direction of the motor 13. Additionally, the one or more trimming blades are biased toward their retracted position by a torsion spring or the like such that when the motor is stopped in the blade trimming mode, the blades are automatically retracted toward their retracted position by the spring.

A fourth preferred embodiment according to the invention will be described with reference to FIG. 7. In this alternative embodiment, the blade trimming mode is effected without reversing the rotation direction of the motor 13. Rather, a pull cable 82 or like actuator is extended at one end to the handle 12 (FIG. 1) and at its other end is secured to a rotary cam plate 84. The rotary cam plate 84 contains one or more cam surfaces 86 such that as the cable 82 is actuated, the rotary cam plate 84 is rotated from a home position to an end position, which is defined by a stop, and the cam surfaces 86 shift the rotary cam plate 84 (upwardly in FIG. 7) into engagement with a pair of latch release pins 88. The cam plate 84 is preferably stamped steel with four cam surfaces formed on its periphery. The latch release pins 58 are coupled with a latch 90 that is displaceable by the latch release pins 88 between a locking position and a releasing position. The latch 90 is preferably formed of stamped sheet metal or the like.

Figure 7:
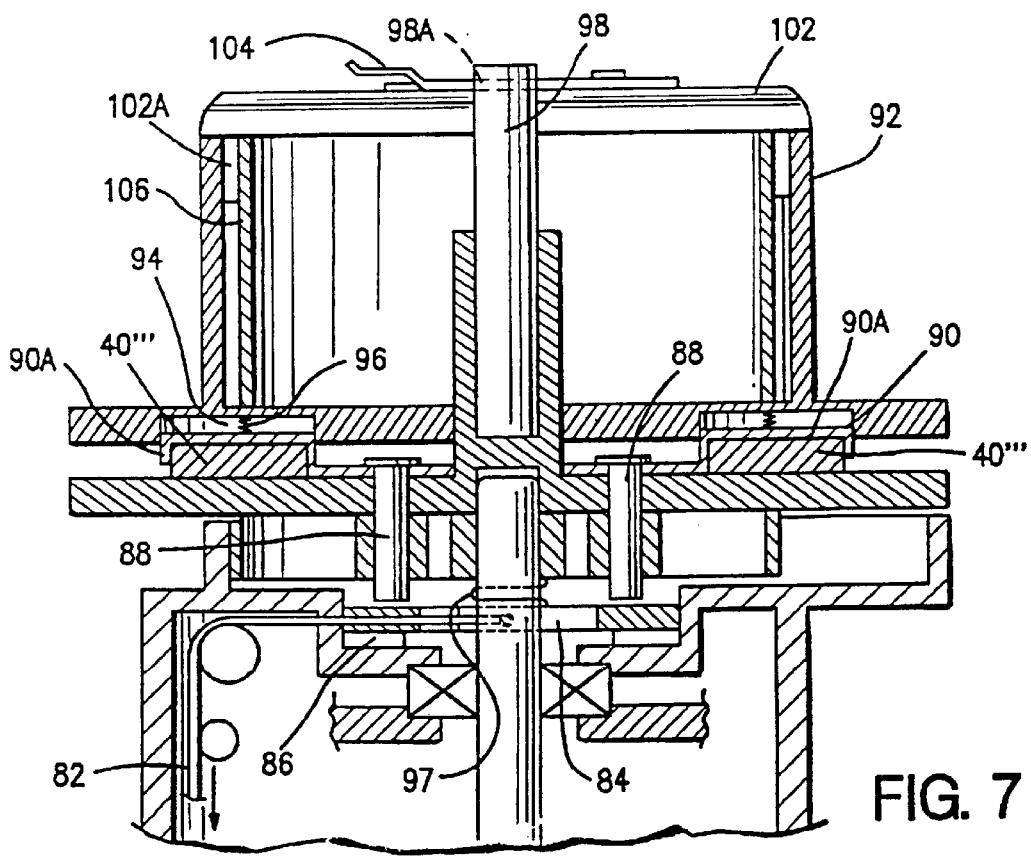
FIG. 7 is a cross-sectional view according to a third embodiment of the present invention.

In the locking position, as shown in FIG. 7, the latch 90 engages the pivotable trimming blades 40''', thereby preventing the trimming blades 40''' from pivoting to their extended position by centrifugal force. A spool housing 92 is provided with suitably shaped cavities 94 such that when the latch 90 is displaced to the releasing position, catching portions 90A of the latch are shifted into the cavities 94 such that the trimming blades 40''' are released by the latch 90 and can be pivoted to their extended position by centrifugal force. A spring 96 is disposed in each cavity 94 to urge the latch 90 toward its locking position. Similar to previously described embodiments, the trimming blades are biased toward the retracted position by a torsion spring or the like.

In operation, when the user desires to switch from the string trimming mode to the blade trimming mode, the user actuates the pull cable 82 to rotate the rotary cam plate 84 from its home position to its end position and thereby release the pivoting trimming blades 40'''. As the motor 13 rotates the assembly, the blades are pivoted to their extended position against the force of the torsion spring by centrifugal force. When the motor 13 is stopped, the blades are pivoted toward the retracted position by the torsion springs. When the user releases the cable 82 for blade trimming, the rotary cam plate 84 returns to its home position by another torsion spring 97, and the latch 90 is returned to its locking position by the springs 96. Because the latch 90 is returned to its locking position before the trimming blades have returned to their retracted position, the trimming blades are prevented from fully retracting by the catch portion 90A of the latch 90. Thus, in this arrangement, in order to fully retract the trimming blades, with the motor 13 stopped, the user merely actuates or pulses the pull cable 82 to raise the latch 90 and allow the trimming blades to return to their fully retracted position. In an alternative arrangement, the catch portions 90A of the latch are provided with a ramped cam surface facing the blades in the extended position such that as the blades are returned to their retracted position, the blades themselves urge the latch 90 upward and out of the way.

With continued reference to FIG. 7, in each of the embodiments described above, the trimming tool is configured such that string spool or blade replacement can be easily achieved. As shown, a spool retaining post 98 is provided with a retaining ring groove or aperture 98A. A cover 102 is fitted within the string spool housing 92 by a friction fit with an edge 102A. A split spring steel clip 104 is extended through the retaining ring groove 98A to secure the cover 102 in place.

To remove or replace the string spool and/or blades, the split spring steel clip 104 can be lifted and pulled outward to clear the groove 98A in the spool retaining post 98. The spool housing cover 102 can then be removed, and the spool 106 can be lifted for replacement. In a like manner, with the cover 102 removed, the spool housing 92 can be lifted from the assembly to readily enable blade replacement.

With the thus described non-reversing alternative embodiment, the user can readily switch between a string trimming mode and a blade trimming mode using the pull cable actuator without requiring implementation of a reversible motor.

In each of the above-described embodiments, the selectable blade assembly can be embodied in the trimming tool or separately as a selectable blade attachment. In the attachment application, the user can readily add the blade assembly to an existing tool. In some applications, the user will also be required to replace the string spool housing with a string spool housing incorporating the lugs 28. As described above, however, the replacement operation can be effected without difficulty.

According to the present invention, each of the preferred embodiments described above can be provided with a blower function to increase the functionality of the trimming tool. In a conventional trimming tool, air flow is generated by at least one air vane secured to the string spool housing 22. The airflow serves to cool the motor during operation. After cooling the motor, the airflow is expelled to the exterior through the tool components.

Figure 8B:
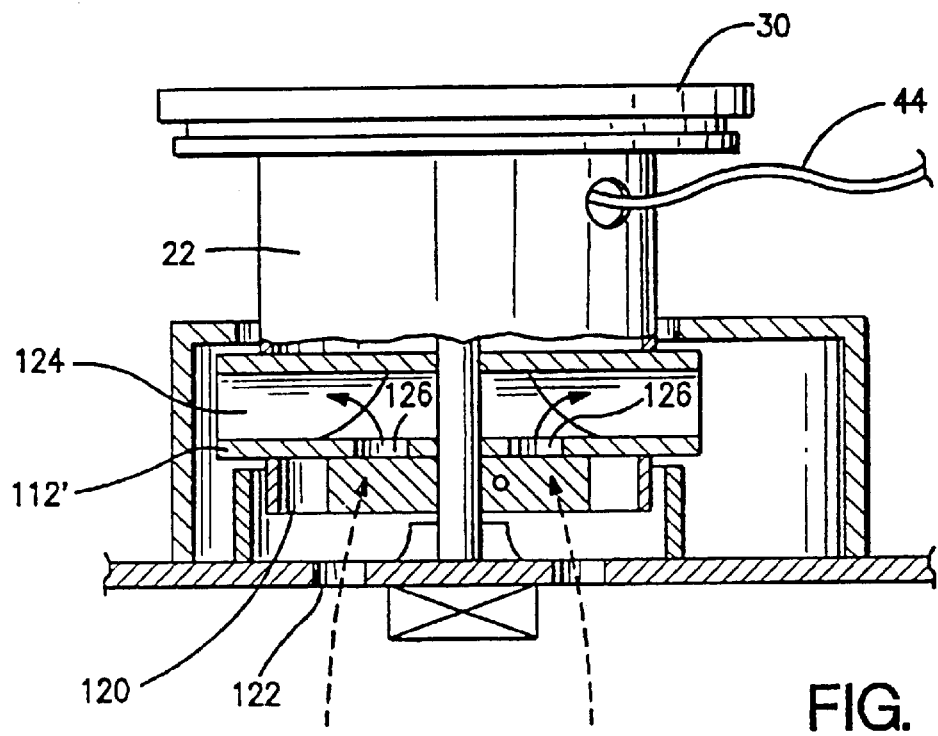
Figure 8A:
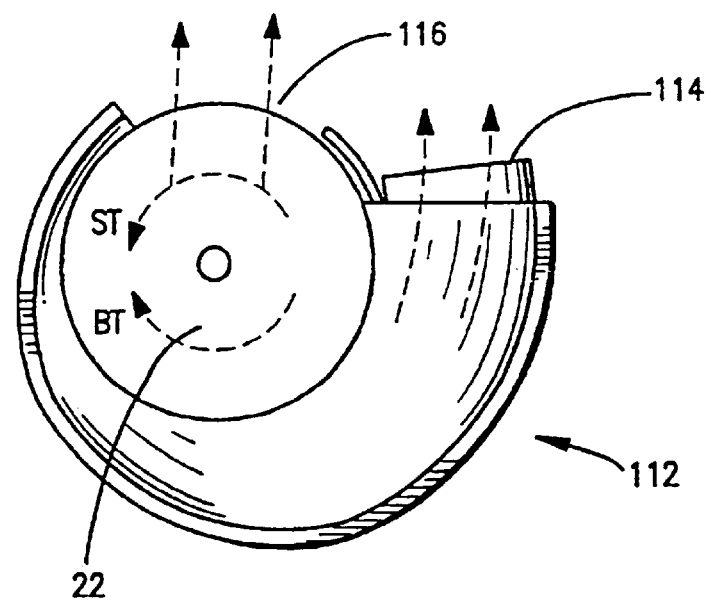

To effect blower functionality, referring to FIG. 8A, a blower flute or scroll 112 may form part of the unit for guiding the airflow to an exit opening 114 as a permanent auxiliary blower capability incorporated into the trimming tool according to the invention. The fan is first separated from the string spool housing 22, and the blower scroll 112 is inserted between the fan and spool. The scroll is screwed or otherwise attached to the underside of the tool guard. The blower flute 112 is thus disposed surrounding the string spool housing 22, thereby guiding the motor cooling air toward the exit opening 114. With the air flow thus directed, the volume and velocity of the air is sufficient for blowing trimmings and the like from the cutting operation.

In the embodiments described above, wherein the motor is reversed to convert from a string trimming mode to a blade trimming mode, it is important to ensure that there is sufficient cooling air for the motor during reverse operation. As shown in FIG. 8A, a second air exit opening 116 is provided in the blower flute 112 allowing air to cool the motor in the blade trimming mode (i.e., when the string spool housing is being rotated in the direction designated by arrow BT).

In an alternative arrangement (not shown), an air exit cover is connected by cable or the like to a handle trim/blow selector switch. In the trim mode, essentially motor cooling air blows into the string or blade plane to act as an air boost. In the blow mode, the cover is full open for mass directed air forward.

In another alternative arrangement, referring to FIG. 8B, a two-stage spool housing fan is provided. The two-stage spool housing fan is coupled with the string spool housing 22. A first stage 120 is provided with one or more air vanes rotating with the spool housing 22. The first stage generates cooling air for the motor by drawing ambient air across the motor and through inlets 122 in the assembly. This air is then directed to a second stage 124, which is also provided with one or more air vanes rotating with the spool housing 22, via inlets 126. The air vanes in the second stage 124 direct air flow into a blower scroll 112' surrounding the fan.

In yet another alternative arrangement, referring to FIGS. 8C and 8D, a blower attachment 130 is structured for selective attachment to an existing string trimmer. The blower attachment 130 includes an internal scroll shroud or involute 132 and is fitted over the motor housing MH to direct the airflow to an exit opening. FIG. 8D illustrates the manner in which an existing guard G is fitted over the motor housing MH. This guard G is removed by disengaging the shoulder assembly from the motor housing MH. The blower attachment is provided with a corresponding shoulder assembly 134. The blower attachment is thus readily adaptable to existing trimming tools.

According to the present invention, a trimming tool can enable easy conversion between a string trimming mode and a blade trimming mode without requiring disassembly of the tool. The trimming blades are extended to their operating positions by centrifugal force, in one arrangement by reversing the rotation of the motor, and in another arrangement by releasing a locking mechanism using a mechanical actuator.

Blower functionality can be added to the trimming tool as a permanent attachment between the string spool housing and the tool guard or as an auxiliary attachment that is readily attachable to existing trimming tools. The blower assembly directs air generated for cooling the motor to an air outlet using a blower flute or scroll. Thus, according to the present invention, a trimming tool is provided with expanded and diverse functionality.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A vegetation cutting tool comprising:
   a reversible electric motor;
   a first cutting implement operably associated with said motor;
   a second cutting implement operably associated with said motor;
   said first cutting implement being useable to cut vegetation when said motor is driven in a first rotational direction, and said second cutting implement being inoperable when said motor is driven in said first rotational direction; and
   said second cutting implement being movable into a cutting position to cut vegetation when said motor is driven in a second rotational direction opposite to said first rotational direction, and said first cutting implement being inoperable when said motor is driven in said second rotational direction.

2. The tool of claim 1, wherein said first cutting implement comprises a filament.

3. The tool of claim 2, further comprising:
   a spool housing adapted to enclose and support said filament;
   wherein said second cutting implement comprises a cutting blade;
   a disc adapted to be secured to said spool housing; and
   wherein said cutting blade is pivotally secured to said disc.

4. The tool of claim 3, further comprising a biasing element for generating a biasing force for biasing said cutting blade into a retracted position when said motor is driven in said first rotational direction, wherein centrifugal force overcomes said biasing force when said motor is driven in said second rotational direction thereby causing said cutting blade to be extended into a cutting position.

5. The tool of claim 1, wherein said second cutting implement comprises a cutting blade.

6. The tool of claim 5, wherein:
   said motor comprises a fan;
   said tool comprises a housing; and
   wherein said housing includes an airflow path for directing a cooling airflow radially away from said housing to thereby effect a blower function for said tool.

7. A vegetation cutting tool comprising:
   a reversible electric motor;
   a first cutting implement operably associated with said motor;
   a second cutting implement operably associated with said motor; and
   wherein only said first cutting implement is useable when said motor is rotated in a first direction and only said second cutting implement is useable when said motor is rotated in a second direction opposite to said first direction.

8. The tool of claim 7, wherein said first cutting implement comprises a filament.

9. The tool of claim 7, wherein said second cutting implement comprises a cutting blade.

10. The tool of claim 7, further comprising:
    a fan operably associated with said motor for generating a cooling airflow;
    a housing for at least partially enshrouding said cutting implements; and
    a scroll for directing said cooling airflow radially outwardly from said housing to thereby effect a blower function for said tool.

11. A vegetation cutting tool having a reversible electric motor and a user actuatable control for reversing said motor such that said motor can be driven in rotationally opposite first and second directions, said tool comprising:
    a first cutting implement operably associated with said motor and useable only when said motor is rotated in said first direction; and
    a second cutting implement operably associated with said motor and movable into a useable position by centrifugal force only when said electric motor is driven in said second direction.

12. The tool of claim 11, wherein said tool further comprises a biasing element operably associated with said second cutting implement for holding said second cutting element in a non-useable position when said motor is driven in said first direction, and wherein said centrifugal force of said motor overcomes a biasing force of said biasing element such that said second cutting element can be urged into said useable position.

* * * * *